US006773156B2

(12) United States Patent
Henning (10) Patent No.: US 6,773,156 B2
(45) Date of Patent: Aug. 10, 2004

(54) METHOD AND APPARATUS FOR REDUCING FLUID STREAKING IN A MOTIONLESS MIXER

(75) Inventor: Jason E. Henning, Plainsboro, NJ (US)

(73) Assignee: TAH Industries, Inc., Robinsville, NJ (US)

( * ) Notice: Subject to any disclaimer, the term of this patent is extended or adjusted under 35 U.S.C. 154(b) by 84 days.

(21) Appl. No.: 10/192,099

(22) Filed: Jul. 10, 2002

(65) Prior Publication Data

US 2004/0008576 A1 Jan. 15, 2004

(51) Int. Cl.⁷ .................................................. B01F 5/06
(52) U.S. Cl. ....................................................... 366/337
(58) Field of Search ................................ 366/336–340

(56) References Cited

U.S. PATENT DOCUMENTS

| | | | |
|---|---|---|---|
| 3,051,453 A | 8/1962 | Sluijters | |
| 3,195,865 A | 7/1965 | Harder | |
| 3,239,197 A | 3/1966 | Tollar | |
| 3,328,003 A | 6/1967 | Chisholm | |
| 3,406,947 A | 10/1968 | Harder | |
| 3,620,506 A | 11/1971 | So | |
| 3,802,668 A | * 4/1974 | Charles-Messance | ....... 425/197 |
| 3,893,654 A | 7/1975 | Miura et al. | |
| 3,928,199 A | 12/1975 | Kirk et al. | |
| 4,040,256 A | 8/1977 | Bosche et al. | |
| 4,159,881 A | * 7/1979 | Gogneau | .................... 48/189.4 |
| 4,179,222 A | 12/1979 | Strom et al. | |
| 4,255,124 A | 3/1981 | Baranowski, Jr. | |
| 4,340,311 A | * 7/1982 | Crandal | ...................... 366/336 |
| 4,632,568 A | * 12/1986 | Emele et al. | ............... 366/337 |
| 4,871,505 A | * 10/1989 | Lapeyre | ................... 264/328.1 |
| 5,492,408 A | 2/1996 | Alfare | |
| 5,779,361 A | * 7/1998 | Sugiura | ...................... 366/340 |
| 5,851,067 A | 12/1998 | Fleischli et al. | |
| 5,944,419 A | 8/1999 | Streiff | |
| 6,599,008 B2 | * 7/2003 | Heusser et al. | ............. 366/337 |
| 2003/0048694 A1 | * 3/2003 | Horner et al. | ............... 366/337 |
| 2003/0164439 A1 | * 9/2003 | Verbrugge | ................... 249/175 |
| 2003/0165080 A1 | * 9/2003 | Pinyayev et al. | ........... 366/337 |

FOREIGN PATENT DOCUMENTS

| | | |
|---|---|---|
| DE | 4120735 A1 | * 12/1992 |
| EP | 0063729 A2 | * 11/1982 |
| GB | 2111718 A | * 7/1983 |

* cited by examiner

Primary Examiner—Charles E. Cooley
(74) Attorney, Agent, or Firm—Katten Muchin Zavis Rosenman; John S. Paniaguas (57) ABSTRACT

An apparatus and method that more effectively reduces fluid streaking in a motionless mixer includes a series of baffles, including a flow inversion baffle. The flow inversion baffle acts to redirect fluid from the center of the fluid flow stream to the periphery of the fluid flow stream while at the same time redirecting fluid flow from the periphery of the fluid flow stream to the center. The transposition of fluid flows eliminates the "channeling" effect and reduces streaking in the extruded mixture.

16 Claims, 8 Drawing Sheets

METHOD AND APPARATUS FOR REDUCING FLUID STREAKING IN A MOTIONLESS MIXER

BACKGROUND

A number of motionless mixer types exist, such as Multiflux, helical and others. These mixer types, for the most part, implement the same general principle to mix fluids together. In these mixers, fluids are mixed together by dividing and recombining the fluids in an overlapping manner. This action is achieved by forcing the fluid over a series of baffles of alternating twisted geometry. Such division and recombination causes the layers of the fluids being mixed to thin and eventually diffuse past one another. This mixing process has proven to be very effective, especially with high viscosity fluids. These mixers are typically constructed of a series of alternating baffles, of varying geometries, usually consisting of right-hand and left-hand elements disposed in a conduit to perform the continuous division and recombination. Such mixer types, while effective in mixing together most of the fluid being mixed, have a tendency to leave streaks of unmixed material in the extruded mixture. These streaks result from channels of fluid forming along the interior surfaces of the conduit that pass through the mixer essentially unmixed.

It has been found that motionless mixers utilizing baffles that have greater degrees of twist are more effective at reducing this streaking phenomenon (e.g., a mixer using 180° baffles will have less streaking than a mixer that employs only 90° baffles). Using baffles with greater degrees of twist, however, raises its own issues. As the degree of baffle twist increases, the length of the mixer required to maintain flow rates equivalent to mixers with baffles of lesser twist also increases. Such an increase in mixer length is unacceptable in most motionless mixer applications. Users of motionless mixers, typically, need to be close to the work piece they are applying the mixture to. The longer a mixer becomes the less manageable it is to work with. In addition, longer mixers will generally have a higher retained volume, entrapping more fluid when the mixer is disposed.

There have been attempts made to maintain adequate mixer length while trying to remedy the streaking problem. Much of this effort has focused on using a combination of mixing baffles of varying degrees of twist (e.g., mixing 90° elements with 180° or 270° elements). In such designs, the bulk of the mixing is done in the baffles of lesser twist (i.e., the 90° elements), which reduces the overall length of the mixer, and then, in the baffles of greater twist (i.e., 180° or 270° elements), the fluid moving along the outer periphery of the mixing elements (i.e., along the interior surface of the conduit) is forced into the center of the mixing elements, but only temporarily. In these arrangements, such fluid is eventually worked back to the outer periphery. Examples of such approaches are described in U.S. Pat. No. 3,239,197 to Tollar and U.S. Pat. No. 5,851,067 to Fleischli et al. While such approaches tend to reduce the width of the streak, the streak is not eliminated. Accordingly, there is a need for a motionless mixer that more effectively reduces streaking while maintaining acceptable mixer length and flow rate. There is also a need to do this in a cost effective manner.

SUMMARY

According to one aspect of the present invention, a motionless mixer includes a conduit and a flow inversion baffle disposed in the conduit in which the flow inversion baffle has a center to perimeter flow portion, a perimeter to center flow portion and a perimeter flow diverter. Fluids introduced into and flowing within the conduit are mixed together by moving the fluids flowing in the center of the fluid flow to the perimeter of flow and by also moving the fluids from the perimeter of the fluid flow to the center of flow. The mixer may also have a plurality of baffle elements. At least one baffle element may be a right-handed baffle element and at least one other baffle element may be a left-handed baffle element. The baffle elements may be integral with one another, and a sidewall may be formed integral with the baffle elements. The baffle elements may be formed by injection molding.

According to another aspect of the present invention, a motionless mixer includes a conduit, at least one flow inversion baffle disposed in the conduit and a plurality of alternating mixing baffles disposed in the conduit. The flow inversion baffle has a center to perimeter flow portion, a perimeter to center flow portion and a perimeter flow diverter. In this aspect of the invention, the center to perimeter flow portion has a chamber wall that defines a center to perimeter flow chamber having an entry and an exit, and the perimeter to center flow portion has a chamber wall that defines a perimeter to center flow chamber having an entry and an exit. The center to perimeter flow portion, the perimeter to center flow portion and the perimeter flow diverter may be integral with one another. The perimeter flow diverter may surround the center to perimeter flow portion and define the entry to the perimeter to center flow chamber. Further, the chamber wall of the perimeter to center flow portion may define an angled baffle adjacent the flow chamber exit. In one aspect of the invention, the alternating baffle elements are right-handed and left handed baffle elements. The alternating right-handed and left-handed baffle elements may have a 90° twist. The conduit of the mixer may be circular, and the flow inversion baffle and the alternating baffle elements may be rounded. The baffle elements may be integral with one another, and a sidewall may be formed integral with the baffle elements. The baffle elements may be formed by injection molding.

According to another aspect of the invention, a method of reducing fluid streaking in a motionless mixer includes providing a conduit having an inlet and an outlet, a flow inversion baffle and a plurality of alternating mixing baffles disposed in the conduit. The flow inversion baffle has a center to perimeter flow portion, a perimeter to center flow portion and a perimeter flow diverter. The method farther includes introducing a plurality of fluids to be mixed to the conduit inlet, forcing the fluids through baffles in the conduit and extruding a mixed fluid composition from the conduit outlet. In another aspect of the invention, a method of making a flow inversion baffle includes providing a set of forming tools that define the structure for a flow inversion baffle having a center to perimeter flow portion, a perimeter to center flow portion and a perimeter flow diverter, setting the forming tools to form a flow inversion baffle mold and injecting plastic resin into the flow inversion baffle mold to form a flow inversion baffle. According to another aspect of the invention, a method of making a baffle assembly includes providing a set of forming tools that define the structure for a flow inversion baffle having a center to perimeter flow portion, a perimeter to center flow portion and a perimeter flow diverter and that further defines a plurality of alternating mixing baffles, setting the forming tools to form a mold for a baffle assembly having a flow inversion baffle and plurality of alternating mixing baffles and injecting plastic resin into the baffle assembly mold to form a baffle assembly.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Figure 1:
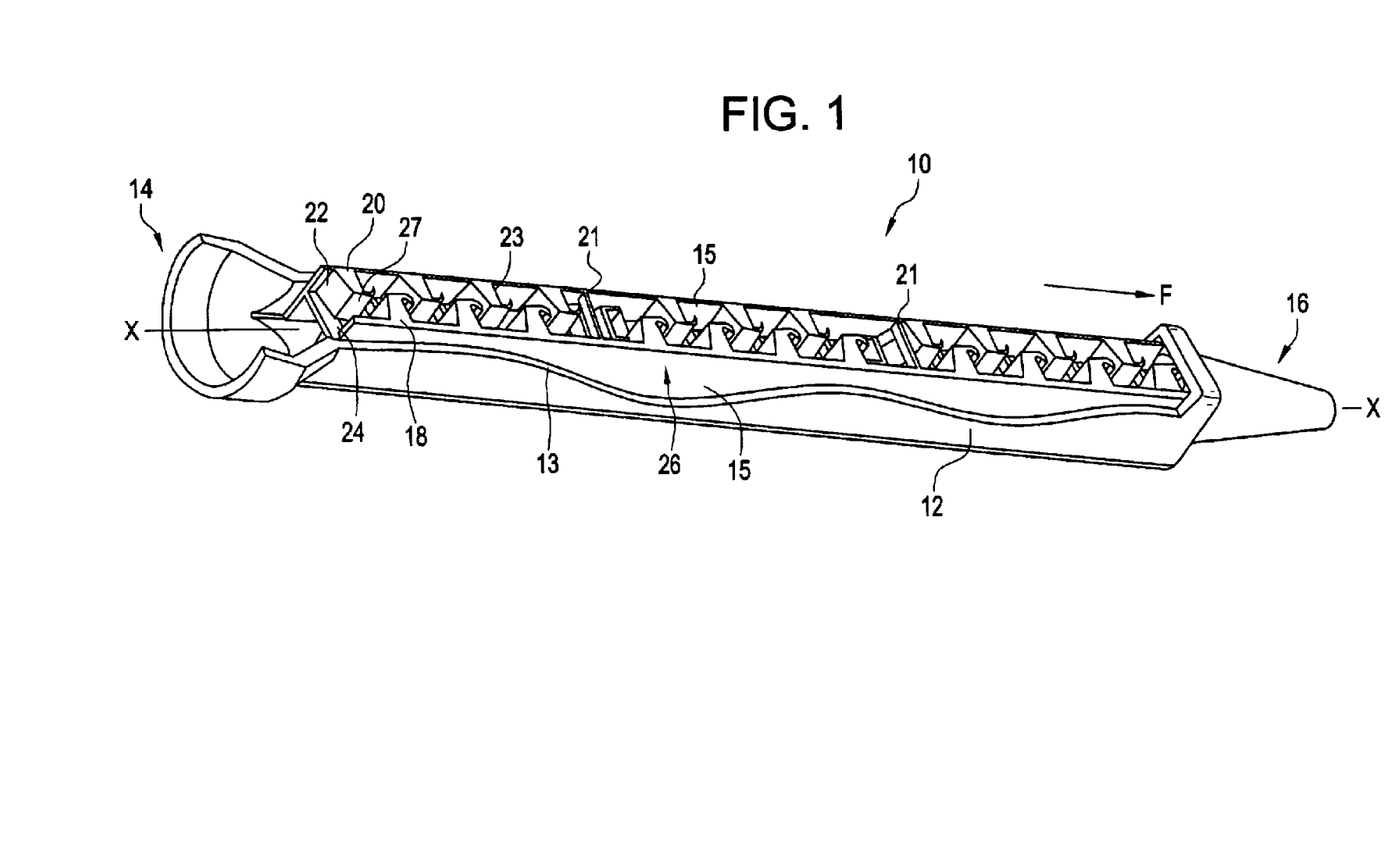
FIG. 1 depicts an embodiment of a motionless mixer of the present invention with a portion of the mixer sidewall removed.
Figure 2:
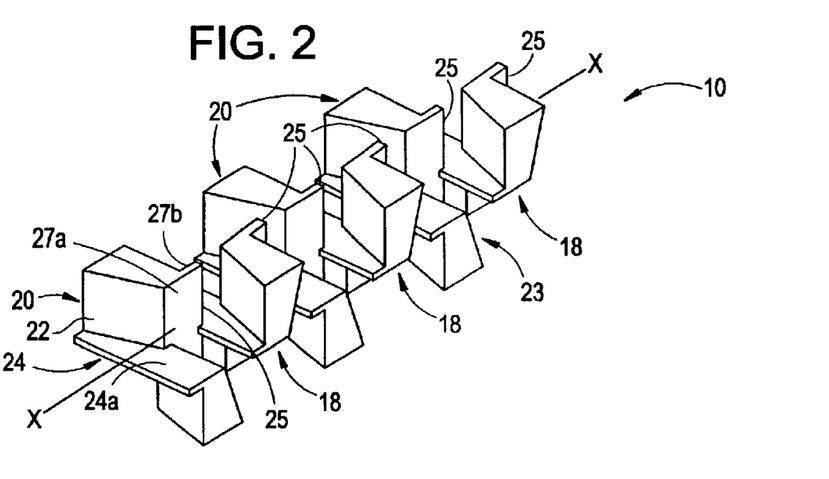
FIG. 2 is an isometric view of interconnected baffles.
Figure 3:
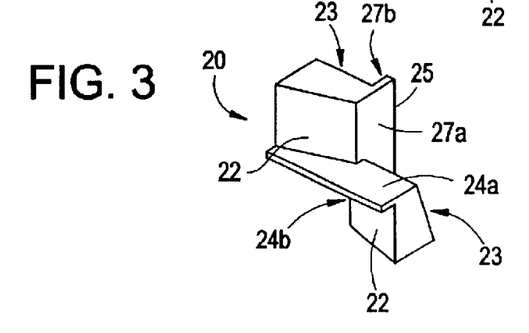
FIG. 3 is an isometric view of a 90° right-handed baffle employed in the mixer of FIG. 2.
Figure 4:
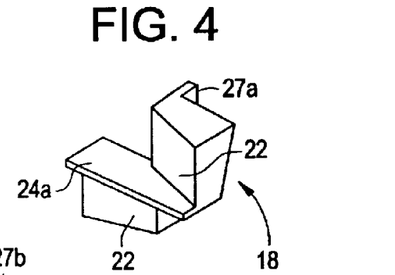
FIG. 4 is an isometric view of a 90° left-handed baffle employed in the mixer of FIG. 2.

Referring to FIG. 1, an embodiment of a mixer 10 of the present invention includes a conduit 12 defining an interior wall 13, an inlet 14 and an outlet 16. The mixer 10 further includes a series of alternating left-handed baffles 18, right-handed baffles 20 and one or more flow inversion baffles 21. The mixer 10 depicted in FIG. 1 is a twenty-four stage mixer having twenty-four baffle elements 18, 20, 21. There are eleven right-handed baffles 18, eleven left-handed baffles 20 and two flow inversion baffles 21. The baffles 18, 20, 21 are disposed within the conduit 12 along a central, longitudinal axis X along which inserted materials flow in a flow direction F. The left-handed and right-handed baffles 18, 20 are mirror images of one another. The baffles 18, 20 are provided with two forward, angled surfaces 22 and two rear, angled surfaces 23 (FIGS. 2–4). The front angled surfaces 22 and rear angled surfaces 23 are connected by two planar webs 24, 27 that intersect one another. In a preferred embodiment, all of the baffles (i.e., left-handed 18, right-handed 20 and flow inversion 21) are formed together as an integral string and are further integral with a pair of opposing sidewalls 15 to form a baffle assembly 26. The sidewalls 15 provide support and rigidity to the baffle assembly 26 during insertion of the assembly 26 into the conduit 12 and during operation of the mixer 10.

Referring to FIGS. 2–4, a portion of an embodiment of a baffle assembly 26 including right and left-handed baffles 18, 20 is depicted. Referring to FIG. 3, the right-handed baffle 20 is provided with a first, generally planar web 24 that has opposing sides 24a and 24b and a second, generally planar web 27 having opposing sides 27a and 27b. The webs 24, 27 extend generally parallel to the flow direction and intersect one another. The right-handed baffle 20 is also provided with a first, forward surface 22 wherein the surface 22 is perpendicular to one side of the web 24a and at an angle to a plane perpendicular to the material flow. A second, forward surface is shown in FIG. 3 wherein the surface 22 is perpendicular to the side of the web 24b at an angle to a plane that is perpendicular to the material flow. FIG. 3 also shows a first, rear surface 23 wherein the surface is perpendicular to one side of the web 27b and at an angle to a plane that is perpendicular to the material flow. The right-handed baffle 20 also has a second, rear surface 23. The second, rear surface 23 is perpendicular to the side of the web 27a and at an angle to a plane that is perpendicular to the material flow. In addition, one of the webs 24, 27 extends past the rear angled surfaces 23 to form a rear fin 25 that extends in the flow direction.

FIG. 4 is a detailed view of a baffle designated as a left-handed baffle 18. The left-handed baffle 18 is formed as a mirror image of the right-handed baffle 20 shown in FIG. 3. Embodiments of the invention may be formed from baffle elements employing geometries differing from those described above.

Figure 5A:
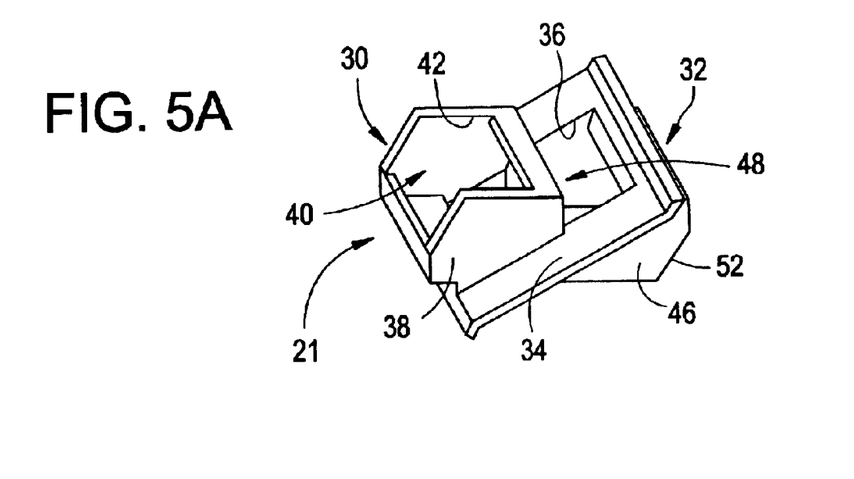
FIG. 5A is an isometric view of an embodiment of a flow inversion baffle of the present invention.
Figure 5B:
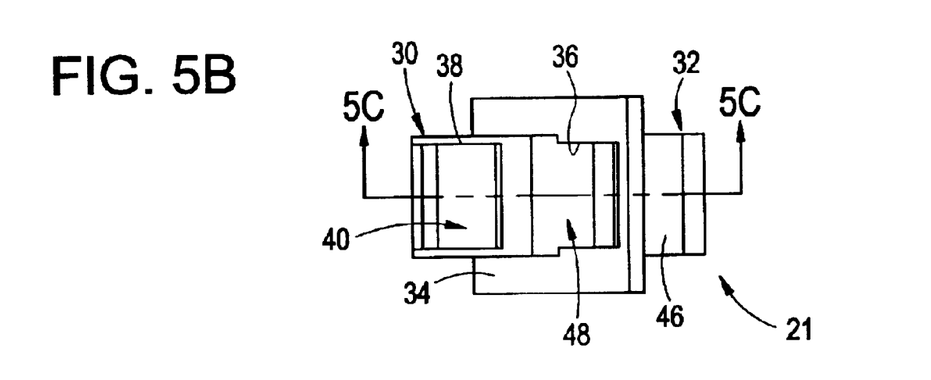
FIG. 5B is a top view of an embodiment of a flow inversion baffle of the present invention.
Figure 5C:
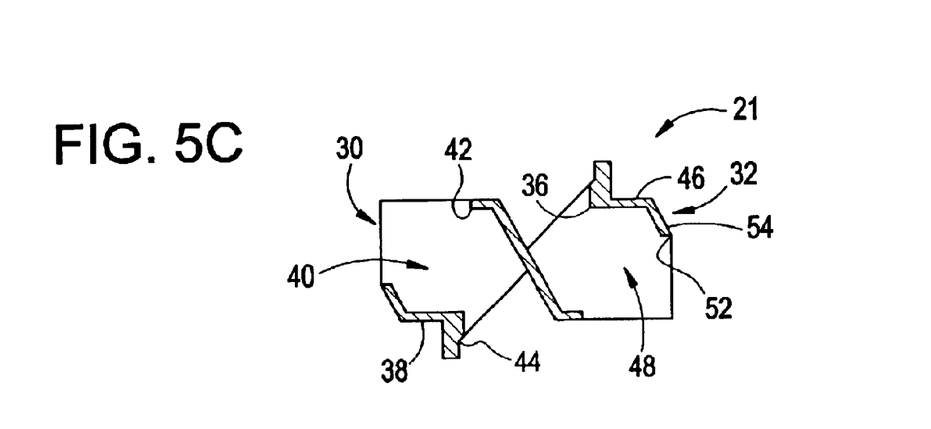
FIG. 5C is a cross-section along the line 5C—5C of FIG. 5B.
Figure 5D:
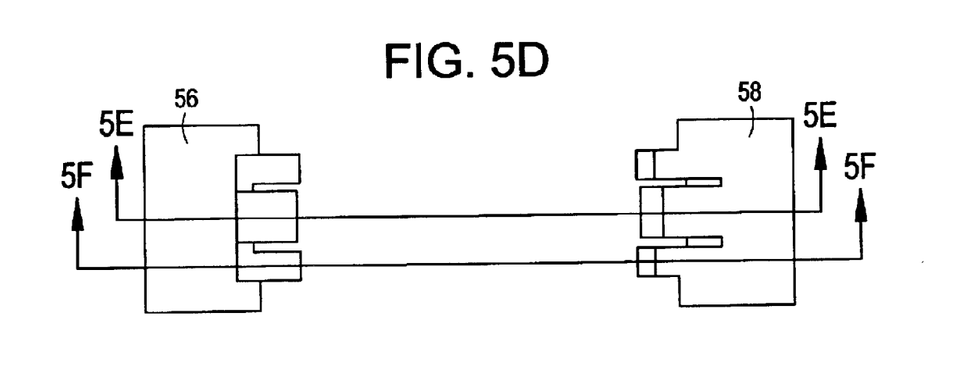
FIG. 5D is a top view of injection molding tooling for forming an embodiment of a flow inversion baffle of the present invention.
Figure 5E:
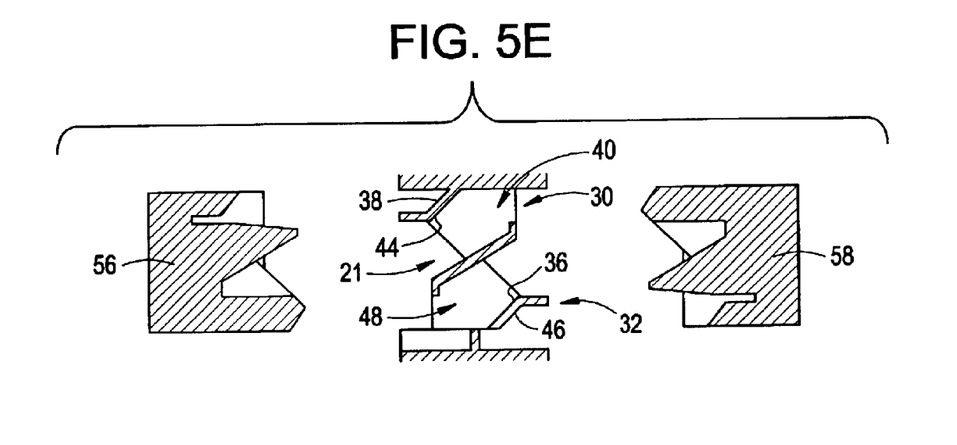
FIG. 5E is a cross-section along the line 5E—5E of FIG. 5D along with the cross-section of a formed flow inversion baffle.
Figure 5F:
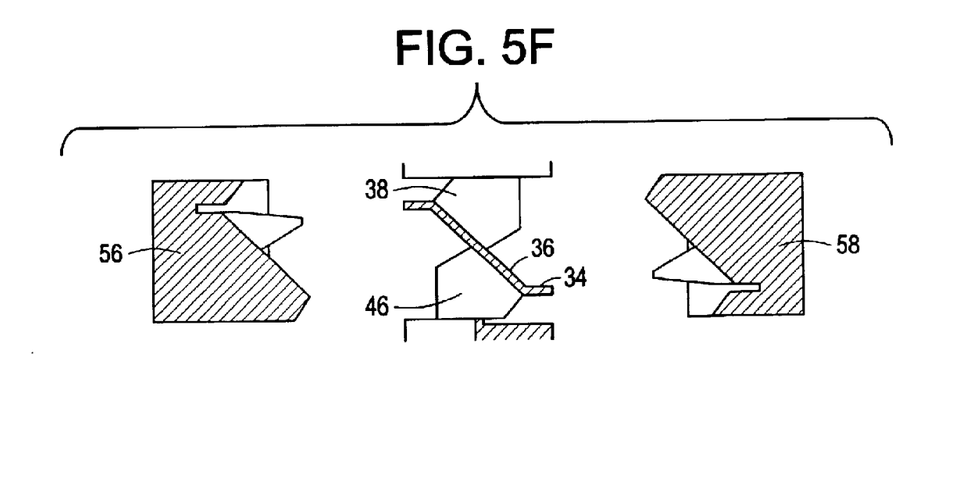
FIG. 5F is a cross-section along the line 5F—5F of FIG. 5D along with the cross-section of a formed flow inversion baffle.

Referring to FIGS. 5A, 5B and 5C, an embodiment of a flow inversion baffle 21 of the present invention is depicted. The flow inversion baffle 21 includes a center to perimeter flow portion 30 and a perimeter to center flow portion 32. In the embodiment depicted, the center to perimeter flow portion 30 is integral with the perimeter to center flow portion 32. The flow inversion baffle 21 includes a perimeter flow diverter 34 that surrounds the center to perimeter flow portion 30 and defines an entry 36 to a perimeter to center flow chamber 48. The perimeter flow diverter 34, in this embodiment, is integral with the mixer sidewalls 15 and, when inserted in the conduit 12, also contacts the conduit wall 13. As described in detail below, the perimeter flow diverter 34 acts to direct all fluid from along the periphery of the baffle assembly 26 into the perimeter to center flow chamber entry 36. The center to perimeter portion 30 includes a chamber wall 38 which defines a center to perimeter flow chamber 40 having an entry 42 and an exit 44. The perimeter flow diverter 34 surrounds and is integral with the chamber wall 38. The perimeter to center flow portion 32 also includes a chamber wall 46 which defines the perimeter to center flow chamber 48. The perimeter to center flow chamber 48, in addition to the entry 36, has an exit 52. The perimeter to center flow portion 32 may further include an angled baffle 54 to aid in the flow inversion process. The dimensions of the flow inversion baffle 21, and in particular the dimensions of the center to perimeter flow chamber 40 and the perimeter to center flow chamber 48, may obviously be varied to accommodate the application of use and/or the production or molding of the baffle. In a preferred embodiment, the flow inversion baffle 21 is made by an injection molding process. Referring to FIGS. 5D–F, exemplary injection molding tooling for an embodiment of a flow inversion baffle 21 is depicted. The molding tooling for this embodiment includes a first tool plate 56 and a second tool plate 58. The tool plates 56, 58 define the structure for the flow inversion baffle 21 to be formed. FIGS. 5E and 5F illustrate the cross-section of a flow inversion baffle 21 formed using tooling plates 56, 58. The flow inversion baffle 21 of the depicted embodiment is designed such that the chamber walls 38, 46 have an open top and bottom, respectively. This design accommodates the injection molding process. By having an open top chamber wall 38 and an open bottom chamber wall 46, the tool plates 56, 58 can be brought together and aligned in a relatively simple fashion to form a flow inversion baffle mold. With the mold formed, the creation of the flow inversion baffle 21 is a relatively simple process known in the art of injecting the plastic resin into the mold and allowing it to cool and form. It should be understood that the entire baffle assembly 26, including left and right-handed baffles 18, 20 and flow inversion baffles 21, could be injection molded together at one time.

Figure 6:
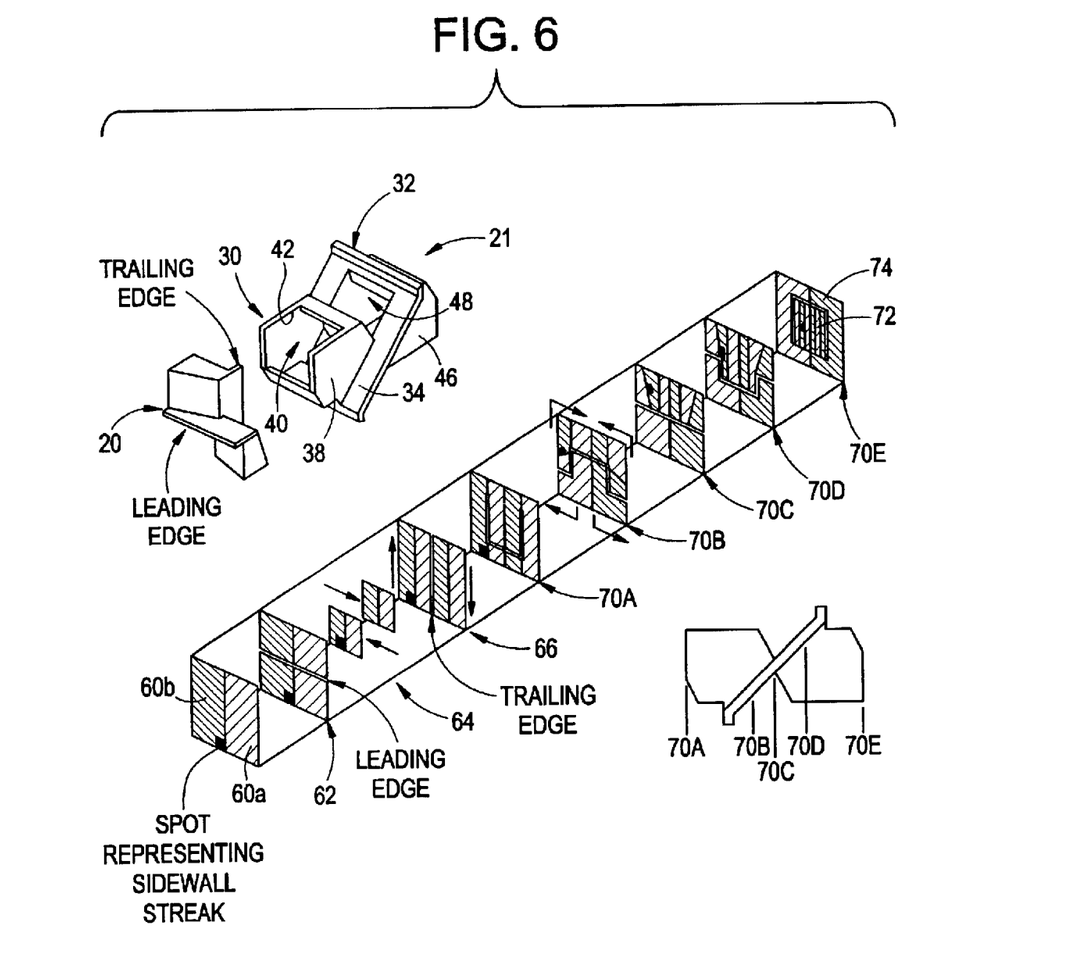
FIG. 6 illustrates the fluid mixing process in an embodiment of the invention.
Figure 7A:
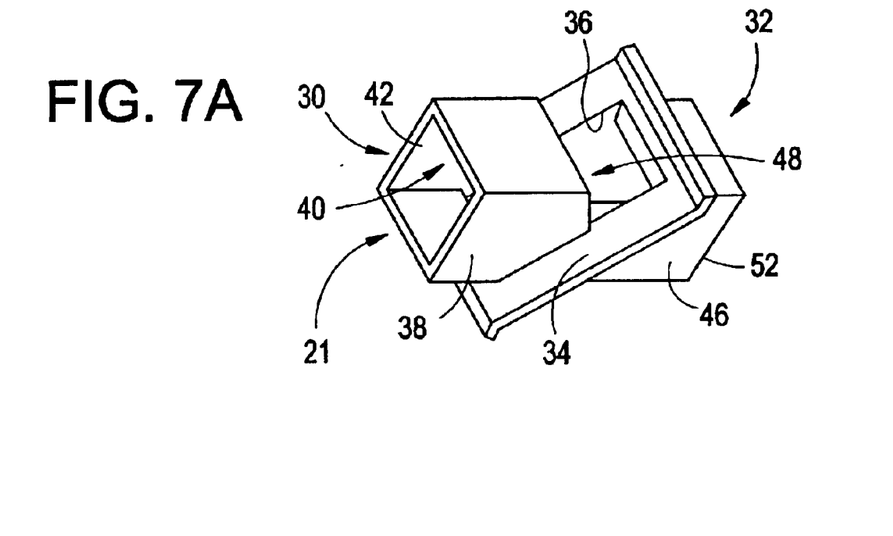
FIG. 7A is an isometric view of another embodiment of a flow inversion baffle of the present invention.
Figure 7B:
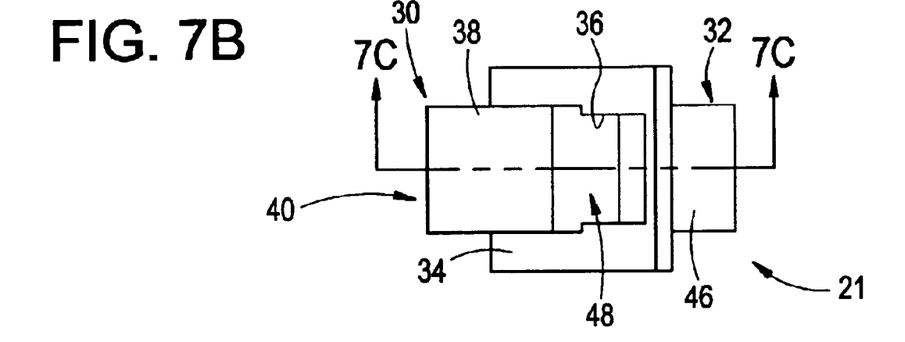
FIG. 7B is a top view of the embodiment of a flow inversion baffle depicted in FIG. 7A.
Figure 7C:
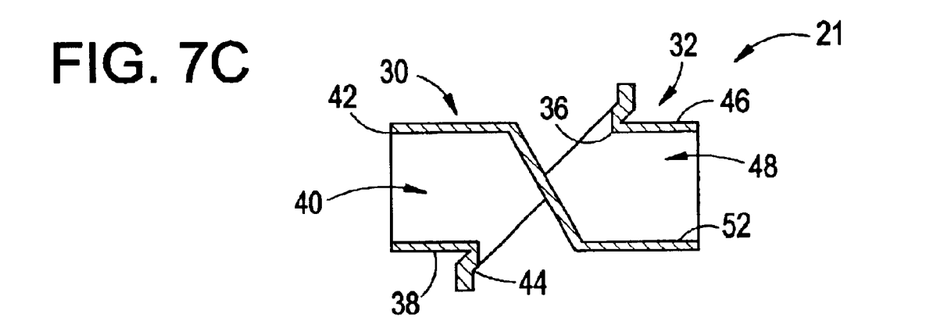
FIG. 7C is a cross-section along the line 7C—7C of FIG. 7B.
Figure 8A:
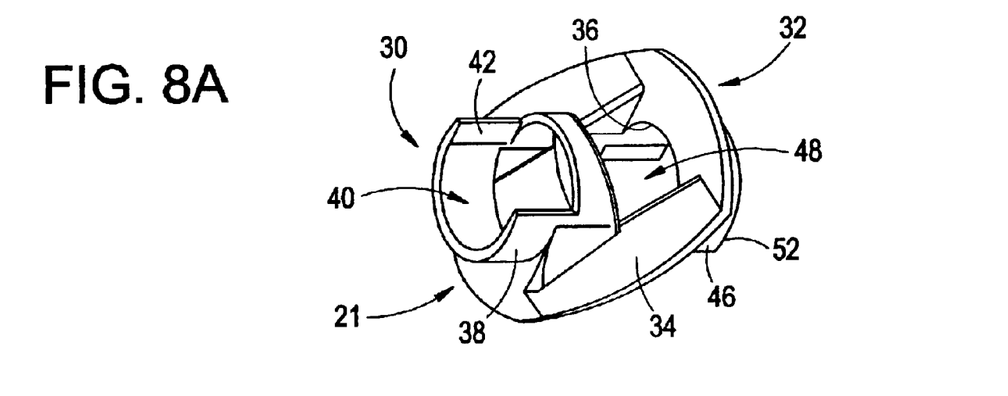
FIG. 8A is an isometric view of another embodiment of a flow inversion baffle of the present invention.
Figure 8B:
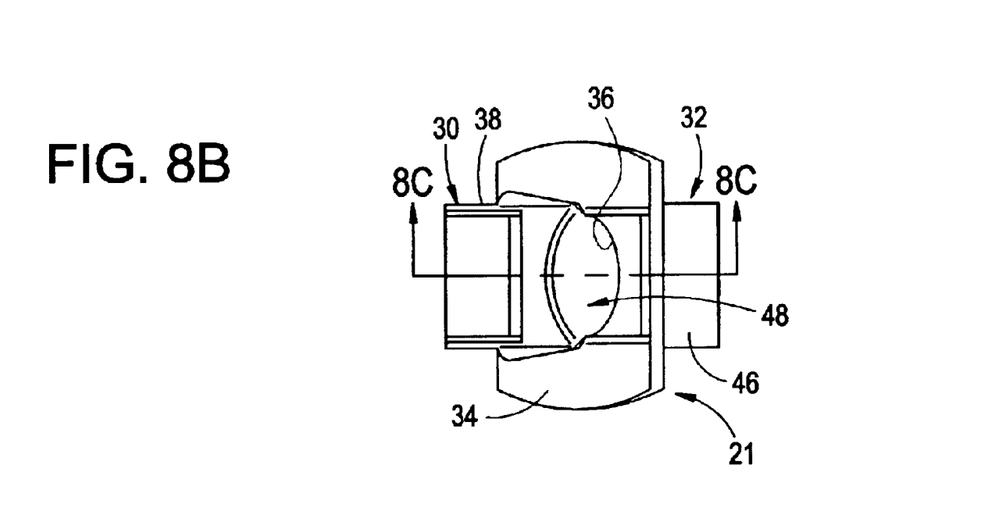
FIG. 8B is a top view of the embodiment of a flow inversion baffle depicted in FIG. 8A.
Figure 8C:
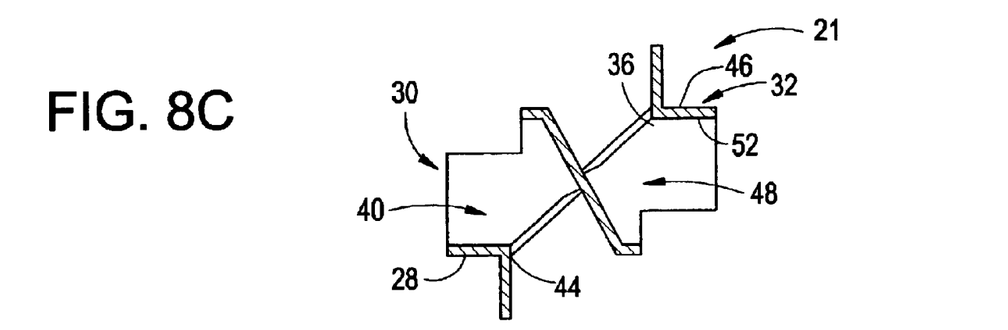
FIG. 8C is a cross-section along the line 8C—8C of FIG. 8B.

Referring to FIG. 6, the mixing characteristics of a right-handed baffle 20 and a flow inversion baffle 21 of the embodiment of the mixer 10 described above are depicted. Two fluids 60a, 60b are introduced into the mixer 10 for mixing. (The fluid 60b has been spot marked along the outer edge to track the mixing of the fluids where channeling typically occurs.) As the two fluids 60a, 60b intersect the leading edge of the right-handed baffle 20, at point 62, the fluid flow is divided in half. As the divided fluid continues to flow through the right-handed baffle 20, the material is shifted laterally by the sub-surfaces of the right-handed baffle 20 at point 64. At point 66, as the fluid leaves the trailing edge of the right-handed baffle element 20, the now mixed fluids stretch to occupy the open space in the baffle assembly 26 within the conduit 12. From the right-handed baffle 20, the mixed fluid continues to flow into the flow inversion baffle 21. As indicated at point 70A, the mixed fluid moving in the interior of the stream is captured by the wall 38 and directed into the center to perimeter flow chamber 40 through the entry 42. The mixed fluid outside of the wall 38 makes contact with the perimeter flow diverter 34. As indicated at points 70B and 70C, as the fluid continues to flow through the mixer 10, the fluid in contact with the perimeter flow diverter 34 moves up the perimeter flow diverter 34, and the fluid captured within the center to perimeter flow chamber 40 exits the center to perimeter flow chamber 40 and expands outward towards the perimeter of the baffle assembly 26 and conduit 12. As indicated at points 70C and 70D, as the fluid continues to flow through the mixer 10, the fluid in contact with the perimeter flow diverter 34 is directed into the perimeter to center flow chamber 48. As point 70D indicates, the fluid captured in the perimeter to center flow chamber 48 flows through the chamber 48. At the same time, the fluid that exited the center to perimeter flow chamber 40 and expanded is forced by the chamber wall 46 and the sidewall 15 upward around the chamber wall 46. At point 70E, the fluid from the perimeter to center flow chamber 48 exits the chamber 48 into the center of the fluid mixing stream (72) surrounded by the fluid that exited the center to perimeter flow chamber 40 (72). As the marking spot indicates, the spot is now mixed within the interior of the fluid flow, and the streaking caused by the "channeling" effect is eliminated.

Figures 9A, 9B, 9C:
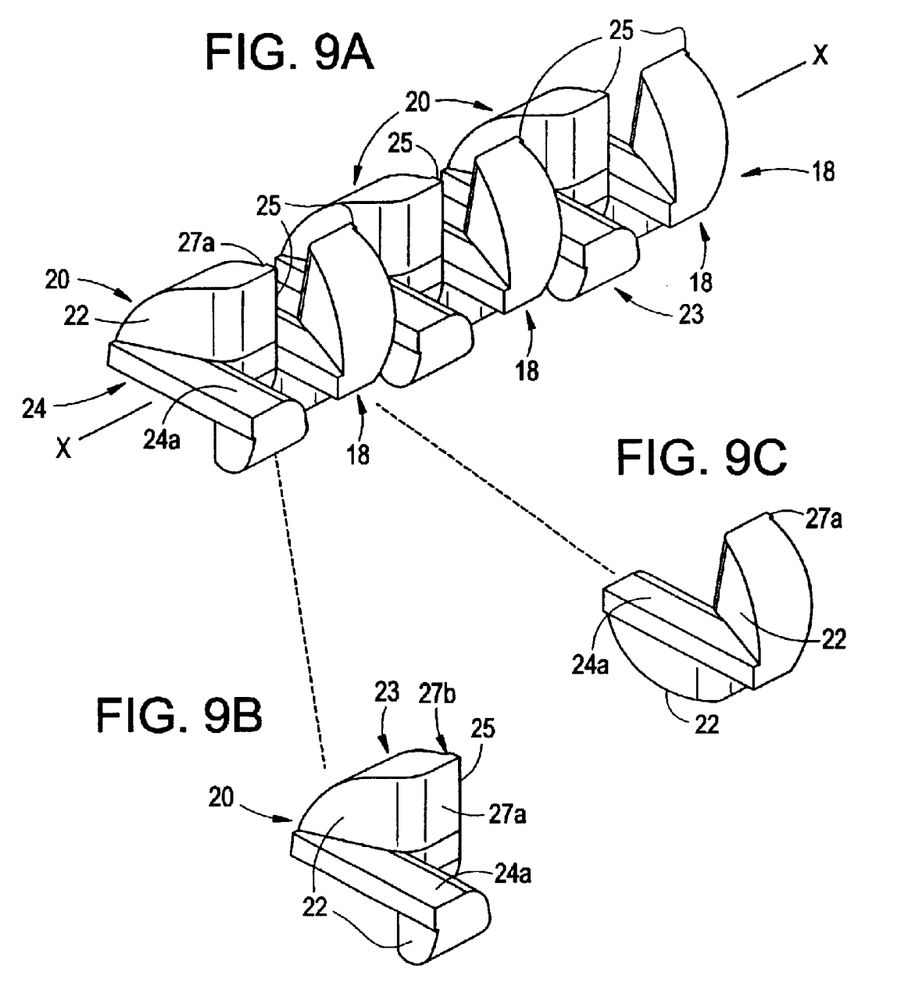
FIG. 9A is an isometric view of another embodiment of interconnected baffles.
FIG. 9B is an isometric view of a 90° right-handed baffle of the embodiment depicted in FIG. 9A.
FIG. 9C is an isometric view of a 90° left-handed baffle of the embodiment depicted in FIG. 9A.

Referring to FIGS. 7A–7C and 8A–8C, other embodiments of flow inversion baffles 21 are depicted. In the embodiment in FIGS. 7A–7C, the center to perimeter flow chamber entry 42 and the perimeter to center flow chamber exit 52 are positioned in line with the flow direction F. In the embodiment in FIGS. 8A–C, the flow inversion baffle 21 is rounded to fit in a round or circular conduit 12. FIGS. 9A–9C depict another embodiment of interconnected baffles in which the baffle elements are rounded. The baffle arrangement depicted in FIGS. 9A–9C could be combined with the flow inversion baffle 21 depicted in FIGS. 8A–C to form a baffle assembly 26 for use in a round or circular conduit 12.

While the invention has been discussed in terms of preferred and specific embodiments, it should be appreciated by those of skill in the art that the invention is not so limited. The embodiments are explained herein by way of example, and there are numerous modifications, variations and other embodiments that may be employed that would still be within the scope of the present invention. The baffles, for instance, could employ a helical design as opposed to the embodiments described herein.

What is claimed is:

1. A motionless mixer, comprising:

a conduit;

a flow inversion baffle disposed in the conduit;

the flow inversion baffle having a center to perimeter flow portion, a perimeter to center flow portion and a perimeter flow diverter defining an inner area;

the center to perimeter flow portion having a chamber wall which defines a flow chamber and which is disposed within the inner area of the perimeter flow diverter; and the perimeter to center flow portion having a chamber wall which defines a flow chamber and the inner area of the perimeter flow diverter defining an entry to the perimeter to center flow chamber, wherein fluids introduced into and flowing within the conduit are mixed together by moving the fluids flowing in the center of the fluid flow to the perimeter of the fluid flow through the center to perimeter flow chamber and by also moving the fluids from the perimeter of the fluid flow to the center of the fluid flow through the perimeter to center flow chamber.

2. The mixer of claim 1 further comprising a plurality of baffle elements.

3. The mixer of claim 2 wherein at least one baffle element is a right-handed baffle element and at least one other baffle element is a left-handed baffle element.

4. The mixer of claim 3 wherein the baffle elements are integral with one another.

5. The mixer of claim 4 further comprising a sidewall formed integral with the baffle elements.

6. The mixer of claim 5 wherein the baffle elements are formed by injection molding.

7. A motionless mixer, comprising:

a conduit;

at least one flow inversion baffle disposed in the conduit, a plurality of alternating mixing baffles disposed in the conduit;

the flow inversion baffle having a center to perimeter flow portion, a perimeter to center flow portion and a perimeter flow diverter defining an inner area;

the center to perimeter flow portion having a chamber wall that defines a center to perimeter flow chamber having an entry and an exit and that is disposed within the inner area of the perimeter flow diverter; and the perimeter to center flow portion having a chamber wall that defines a perimeter to center flow chamber having an entry and an exit and the inner area of the perimeter flow diverter defining an entry to the perimeter to center flow chamber.

8. The mixer of claim 7 wherein the center to perimeter flow portion, the perimeter to center flow portion and the perimeter flow diverter are integral with one another.

9. The mixer of claim 7 wherein the chamber wall of the perimeter to center flow portion defines an angled baffle adjacent the flow chamber exit.

10. The mixer of claim 7 wherein the alternating baffle elements are right-handed and left handed baffle elements.

11. The mixer of claim 10 wherein the alternating right-handed and left-handed baffle elements have a 90° twist.

12. The mixer of claim 10 wherein:

the conduit is circular;

and the flow inversion baffle and the alternating baffle elements are rounded.

13. The mixer of claim 10 wherein the baffle elements are integral with one another.

14. The mixer of claim 13 further comprising a sidewall formed integral with the baffle elements.

15. The mixer of claim 14 wherein the battle elements are formed by injection molding.

16. A method of reducing fluid streaking in a motionless mixer, comprising:

providing a conduit having an inlet and an outlet, a flow inversion baffle and a plurality of alternating mixing baffles disposed in the conduit; wherein the flow inversion baffle has a center to perimeter flow portion having a chamber wall which defines a flow chamber, a perimeter to center flow portion having a chamber wall which defines a flow chamber and a perimeter flow diverter;

introducing a plurality of fluids to be mixed to the conduit inlet;

forcing the fluids through the baffles in the conduit creating a fluid stream, wherein the flow inversion baffle directs fluid flowing in the interior of the fluid stream to the perimeter of the fluid stream through the center to perimeter flow chamber and directs fluid flowing along the perimeter of the fluid stream to the center of the fluid stream through the perimeter flow diverter diverting the fluid flowing along the perimeter of the fluid stream into and through the perimeter to center flow chamber; and extruding a mixed fluid composition from the conduit outlet.

* * * * *